United States Patent [19]

Shishido et al.

[11] Patent Number: 4,775,562
[45] Date of Patent: Oct. 4, 1988

[54] MEDICAL BAG

[75] Inventors: Kihahi Shishido, Yokohama; Toshio Taka, Fujisawa; Hisasi Hatano; Toshihiko Funato, both of Kawasaki, all of Japan

[73] Assignee: Showa Denko Kabushiki Kaisha, Tokyo, Japan

[21] Appl. No.: 899,850

[22] Filed: Aug. 25, 1986

[30] Foreign Application Priority Data

Aug. 23, 1985 [JP] Japan .................................. 60-183828
Sep. 17, 1985 [JP] Japan .................................. 60-203499

[51] Int. Cl.$^4$ ......................... B65D 30/02; B32B 7/02; B32B 27/08
[52] U.S. Cl. ..................................... 428/35; 428/212; 428/213; 428/218; 428/516
[58] Field of Search ................. 428/35, 516, 212, 213, 428/216, 218

[56] References Cited

U.S. PATENT DOCUMENTS

| | | | |
|---|---|---|---|
| 4,147,827 | 4/1979 | Breidt, Jr. | 428/218 |
| 4,160,053 | 7/1979 | Clayton | 428/35 |
| 4,364,981 | 12/1982 | Horner et al. | 428/516 |
| 4,399,173 | 8/1983 | Anthony et al. | 428/516 |
| 4,399,180 | 8/1983 | Briggs et al. | 428/516 |
| 4,418,114 | 11/1983 | Briggs et al. | 428/516 |
| 4,464,426 | 8/1984 | Anthony | 428/35 |

*Primary Examiner*—John E. Kittle
*Assistant Examiner*—James J. Seidleck
*Attorney, Agent, or Firm*—Sughrue, Mion, Zinn, Macpeak & Seas

[57] ABSTRACT

A medical bag composed of a laminate comprising (i) an inner layer of a low-density polyethylene, an ethylene-1-olefin copolymer having a density of 0.920 g/cm$^3$ or more, or a high density polyethylene, (ii) an intermediate layer of an ethylene-1-olefin copolymer having a density of 0.935 g/cm$^3$ or less, and (iii) an outer layer of a low-density polyethylene, an ethylene-1-olefin copolymer having a density of 0.920 g/cm$^3$ or more, or a high-density polyethylene.

7 Claims, No Drawings

MEDICAL BAG

BACKGROUND OF THE INVENTION

1. Field of the Invention

The present invention relates to a medical bag having excellent sanitariness, flexibility, transparency, and heat-resistance and suitable for use as a container of blood and various medicinal liquids. More specifically, it relates to a medical bag composed of a laminate comprising (i) an inner layer, (ii) an intermediate layer, and (iii) an outer layer. The interlayer is derived from an ethylene-1-olefin copolymer having a density of 0.935 g/cm$^3$ or less and the inner and outer layers are independently derived from a polymer selected from the group consisting of low-density polyethylenes, linear low-density ethylene copolymers, and high-density polyethylenes.

2. Description of the Related Art

Rigid containers made of, for example, glass, polyethylene, and polypropylene, and flexible (or non-rigid) bags made of, for example, poly(vinyl chloride) containing plasticizers are heretofore known as medical containers or bags. The rigid containers, however, have a disadvantage in that air is introduced into the containers by using a transfusion set provided with a vent needle or hole when the liquid contained therein is dropwise introduced into a human body through, for example, a vein, and therefore, the liquid contained therein might be contaminated and air can enter the vein to cause an air embolus therein. Thus, these rigid containers do not completely satisfy the requirements of sanitariness and safety. On the other hand, flexible bags have advantages in that the introduction of air is not required, the bag itself is naturally compressed under atmospheric pressure with the dropwise introduction of the liquid contained therein, the introduction of air contained in the bag into a human body does not occur since the liquid contained therein fills the bottom of the bag at the completion of transfusion, a rapid transfusion can be carried out under pressure, and the bags is not bulky, unlike containers, and therefore, the transportation thereof is easy. For these reasons, the use of the flexible bags as medical containers or bags has increased. The use of these flexible bags, especially those made of non-rigid poly(vinyl chloride), however, involves possible problems caused by the migration of plasticizers into the liquid contained in the bags and the toxicity of the vinyl chloride monomer contained in poly(vinyl chloride).

Japanese Unexamined Patent Publication (Kokai) No. 58-165866 proposed a medical bag composed of a laminate comprising, as an intermediate layer, ethylene-vinyl acetate copolymer, ethylene-propylene type elastomer, or ethylene-butene-1 type elastomer. But, although this medical bag has excellent sanitariness, flexibility, and transparency, the heat-resistance thereof is low and thus the appearance thereof is not satisfactory due to the generation of wrinkles and of failures in the bag when, for example, the bag is subjected to a sterilization treatment temperature (e.g., 121° C. or more).

SUMMARY OF THE INVENTION

Accordingly, the object of the present invention is to eliminate the above-mentioned disadvantages and problems of the prior art and to provide a medical bag having an excellent sanitariness, flexibility, transparency, and heat-resistance against a sterilization treatment temperature.

Other objects and advantages of the present invention will be apparent from the following description;

In accordance with the present invention, there is provided a medical bag composed of a laminate comprising (i) an inner layer of a low-density polyethylene, an ethylene-1-olefin copolymer having a density of 0.920 g/cm$^3$ or more, or a high-density polyethylene, (ii) an intermediate layer of an ethylene-1-olefin copolymer having a density of 0.935 g/cm$^3$ or less, and (iii) an outer layer of a low-density polyethylene, an ethylene-1-olefin copolymer having a density of 0.920 g/cm$^3$ or more, or a high-density polyethylene.

DESCRIPTION OF THE PREFERRED EMBODIMENT

Inner and Outer Layer

The low-density polyethylene usable as the inner and outer layers of the medical bag according to the present invention are those having a density of 0.930 g/cm$^3$ or less. The sanitariness of a low-density polyethylene having a density of 0.930 g/cm$^3$ or less is far superior to that of poly(vinyl chloride), and the bag also has a good flexibility and transparency. The use of a low-density polyethylene having a density of 0.920 g/cm$^3$ or more and having a melt flow rate, according to the ASTM D1238 method, Condition E (i.e., "MFR" hereinafter), of 0.1 to 20 g/10 min, more preferably 0.1 to 15 g/10 min, especially preferably 0.1 to 10 g/10 min, is desirable from the viewpoint of the sterilization treatment temperature conditions.

The low-density polyethylenes are so-called high-pressure-produced polyethylenes composed of a main chain and long-chain branches. The term "long-chain branch" used herein means those having a length sufficient to be comparable with the main chain, for example, those having 15 or more carbon atoms.

The linear low-density ethylene copolymers usable as the inner and outer layers of the medical bag according to the present invention are those obtained by copolymerizing ethylene and a 1-olefin or 1-olefins. The 1-olefins usable in the copolymerization of the linear low-density ethylene copolymers are preferably those having 12 or less carbon atoms. Examples of such 1-olefins are propylene, butene-1, hexene-1, 4-methylpentene-1, and octene-1. Although there are no critical limitations to the content of the 1-olefin in the linear low-density ethylene copolymers, the density of the copolymers is decreased with the increase of the content of the 1-olefin in the copolymers. When the amount of the 1-olefin to be copolymerized in the copolymer is increased, not only is the density of the copolymer decreased but also the flexibility and the transparency of the copolymers are improved, due to the increase of the short branches derived from the 1-olefin in the copolymer. This is similar in the case of the increase of the long-chain branches in the above-mentioned low-density polyethylene. Nevertheless, although the melting point is decreased with the decrease of the density in the case of the low-density polyethylene, the melting point is substantially saturated around a temperature of 120° C. in the case of linear low-density ethylene copolymers, unlike the low-density polyethylenes. Thus, by utilizing these characteristics, the linear low-density ethylene copolymers can be advantageously used as the inner and outer layers having an excellent flexibility, transparency, and heat-resistance. The "short chain branches" used herein means those having a sufficiently short length when compared with the main chain, for example, those having a carbon atom number of less than 15. The preferable 1-olefin content of the linear low-density ethylene copolymer usable as the inner or outer layer of the present invention is 5% to 20% by weight, depending upon the desired characteristics of the inner or outer layer.

The density of the linear low-density ethylene-1-olefin copolymer is preferably 0.920 g/cm$^3$ or more, more preferably 0.920 to 0.935 g/cm$^3$, and the MFR thereof is preferably 0.1 to 20 g/10 min, more preferably 0.1 to 15 g/10 min, especially preferably 0.1 to 10 g/10 min, from the viewpoints of moldability and mechanical strength. The linear low-density ethylene-1-olefin copolymers suitable for use as the inner and outer layers are those having a melting point of 120° C. or more and a Young's modulus of 1200 kg/cm$^2$ or more, preferably 1200 to 8000 kg/cm$^2$.

The high-density polyethylenes usable as the inner and outer layers in the present invention are so-called low-pressure-produced polyethylenes composed of a main chain and short-chain branches. The term "short chain branches" used herein means those having a sufficiently short length when compared to the main chain, for example, those having a carbon atom number of less than 15. The high-density polyethylenes suitable for use in the inner and outer layers preferably have a density of 0.935 g/cm$^3$ or more, more preferably 0.940 to 0.965 g/cm$^2$, and preferably have an MFR of 0.2 to 10.0 g/10 min, more preferably 0.2 to 5.0 g/10 min.

INTERMEDIATE LAYER

The ethylene-1-olefin copolymers usable as the intermediate layer of the medical bag according to the present invention are those having a melting point of 115° C. to 125° C., preferably 118° C. to 123° C., and a Young's modulus smaller than those of the inner and outer layers. These ethylene-1-olefin copolymers may include the so-called linear low density polyethylenes (i.e., ethylene-1-olefin copolymers), propylene-ethylene random copolymers, and ethylene-propylene type elastomers.

The linear low-density ethylene copolymers usable as the intermediate layer of the medical bag according to the present invention are those preferably having a density of 0.935 g/cm$^3$ or less, more preferably 0.925 g/cm$^3$ or less, especially preferably 0.920 g/cm$^3$ or less, a melting point of 115° C. or more, more preferably 118° C. or more, an MFR of 0.1 to 20 g/10 min, more preferably 0.1 to 15 g/10 min, especially preferably 0.2 to 10 g/10 min. The 1-olefins usable in the copolymerization of the ethylene-1-olefin copolymers are preferably those having 12 or less. Examples of such 1-olefins are propylene, butene-1, hexene-1, 4-methylpentene-1, and octene-1. Although there are no critical limitations to the content of the 1-olefins in the copolymer, the density of the copolymers is decreased with the increase in the content of the 1-olefins in the copolymer due to the increase in the amount of the short-chain branches derived from the 1-olefins. The term "short branches" used herein means those having a sufficiently short length when compared with the main chain, for example, those having the carbon number of less than 15. Thus, the preferable 1-olefin content of the ethylene-1-olefin copolymers is 5% to 20% by weight depending upon the desired characteristics of the intermediate layer. As mentioned previously, when the amount of the 1-olefins to be copolymerized in the copolymer is increased, not only is the density of the copolymer decreased, but also the flexibility and transparency of the copolymers are improved due to the increase of the short branches derived from the 1-olefin in the copolymer. This is similar in the case of the increase of the long-chain branches in the above-mentioned low-density polyethylene. Nevertheless, although the melting point is decreased with the decrease of the density in the case of the low-density polyethylene, the melting point is substantially saturated around a temperature of 120° C. in the case of the ethylene-1-olefin copolymers. Thus, the conventional correlation between the density and the melting point in the polyethylene is not held in the ethylene-1-olefin copolymers used as an intermediate layer in the present invention. Thus, according to the present invention, by utilizing these characteristics, the ethylene-1-olefin copolymers can be advantageously used as the intermediate layer having an excellent flexibility, transparency, and heat resistance. Especially, the ethylene-1-olefin copolymers having a density of 0.920 g/cm$^3$ or less, especially 0.915 g/cm$^3$ or less, are particularly suitable because they are extremely flexible and have a strong adhesivity to the inner and outer layers composed of, for example, low-density polyethylene.

Although there are no critical limitations to the density, the MFR, the melting point, and the Young's modulus of the inner, intermediate, and outer layers of the medical bag according to the present invention, preferable ranges of the density, and the MFR are as follows.

That is, generally speaking, the inner and outer layers independently have a density of 0.920 to 0.950 g/cm$^3$, more preferably 0.920 to 0.945 g/cm$^3$, especially preferably 0.920 to 0.940 g/cm$^3$, and an MFR of 0.1 to 10.0 g/10 min, more preferably 0.2 to 5.0 g/10 min, especially preferably 0.2 to 4.0 g/10 min. When the density is less than 0.920 g/cm$^3$, the heat-resistance against a sterilization treatment at 121° C. tends to decrease after the bag is filled with liquid contents. Contrary to this, when the density is more than 0.950 g/cm$^3$, the stiffness of the resultant laminate tends to become large and, therefore, the laminate tends to become unsuitable as a medical bag. When the MFR is less than 0.1 g/10 min, the good film or sheet s difficult to be obtained by a melt extrusion molding method. Contrary to this, when the MFR is more than 10.0 g/10 min, the mechanical strength of the resultant film or sheet tends to decrease and, therefore, the film or sheet is not suitable for use as a medical bag.

On the other hand, the intermediate layer has a density of 0.920 g/cm$^3$ or less, more preferably 0.915 g/cm$^3$ or less, especially preferable at least 0.880 g/cm$^3$ but less than 0.910 g/cm$^3$, and an MFR of 0.1 to 20 g/10 min, preferably 0.1 to 15 g/10 min, especially preferably 0.1 to 10 g/10 min. When the density is more than 0.920 g/cm$^3$, the stiffness of the resultant laminate tends to become large and, therefore, the laminate tends to become unsuitable as a medical bag. When the MFR is less than 0.1 g/10 min, the good film or sheet is difficult to be obtained by a melt extrusion molding method. Contrary to this, when the MFR is more than 20 g/10 min, the impact strength of the resultant film or sheet tends to decrease and, therefore, the medical bag formed therefrom tends to be suffered from undesirable problems during the thermal sterilization treatment and the handling thereof.

The melting point of the intermediate layer of the present medical bag is preferably 115° to 125° C., preferably 115° to 123° C., more preferably 118° to 123° C. When the melting point is less than 115° C., the strain tends to be generated between the intermediate layer and the inner and outer layers and the wrinkles are generated in the bag. Contrary to this, the ethylene-1-olefin copolymer having the above-mentioned density and MFR and the melting point of more than 125° C. has not been produced. Furthermore, according to the present invention, the Young's modulus, determined by the ASTM D882 method, of the intermediate layer is preferable smaller than, more preferably is 80% or less of those of the inner and outer layers because the natural dischargeability of the resultant bag becomes excellent. Generally speaking, the Young's modulus of the inner and outer layers is preferably 1200 to 8000 kg/cm$^2$, more preferably 1200 to 5000 kg/cm$^2$, and the Young's modulus of the intermediate layer is preferably 600 to 3500 kg/cm$^2$, more preferably 600 to 3000 kg/cm$^2$.

The laminate according to the present invention can be prepared by any conventional lamination method, such as a water-cooling or air cooling type co-extrusion inflation method, a co-extrusion T-die method, a dry lamination method, or an extrusion lamination method. The use of the water-cooling type co-extrusion inflation method and co-extrusion T-die method is desirable from an economical point of view. The laminate is generally prepared in the form of a tube or sheet, and then heat-sealed to form a bag having an appropriate shape and desired dimensions. The attachments for a liquid inlet and outlet are then attached to the bag.

Although there are no critical limitations to the thickness of the laminates according to the present invention, the thickness of the laminates is preferably 150 to 400 μm, more preferably 200 to 300 μm.

A thickness of less than 150 μm tends to give the bag an insubstantial feeling, whereas a thickness of more than 400 μm tends to result in an insufficient flexibility. Although there is no specific limitation on the thickness of each layer, desirably the thickness of the intermediate layer is 50 to 90%, more desirably 50% to 86%, of the total thickness of the laminate so as to afford a sufficient flexibility to the laminate. Furthermore, the thickness of the inner or outer layer is preferably 5% to 25%, more preferably 7% to 22% of the total thickness of the laminate so as to obtain the desired flexibility and mechanical strength.

The inside and outside surfaces of the medical bag thus obtained are washed or cleaned with distilled water or disinfected water having a predetermined temperature, prior to the filling of the liquid to be contained in the bag, if necessary, and the liquid filled in the bag after drying. The medical bag containing the liquid is then subjected to a sterilization treatment by, for example, a high pressure steam method. Typical conditions of the high pressure steam sterilization are, for example, 115° C.×30 min and 121° C.×20 min. It has been found that the transparency of the medical bag is improved when the bag is subjected to a heat treatment at a temperature of 40° C. or more for at least 10 minutes.

EXAMPLES

The present invention will now be further illustrated by, but is by no means limited to, the following Examples and Comparative Examples.

In the following Examples and Comparative Examples, the various properties and characteristics of the medical bags were determined as follows.

Density: Determined at 23° C.±0.1° C. according to the ASTM D1505 method;

Melting Point: Determined at a temperature increase rate of 10° C./min according to the so-called DSC method;

Flexibility: Young's modulus was determined according to the ASTM D-882 method;

Natural dischargeability: Visually observed;

Heat-resistance: The conditions (e.g., wrinkles, deformation, breaking) were visually observed after the bag containing the liquid content (i.e., physiological saline solution) was subjected to a high pressure steam sterilization treatment at a temperature of 115° C. or 121° C. for 30 minutes, followed by treating at a temperature of 40° C. for 40 minutes;

Transparency: The bag was filled with physiological saline solution and the transparency was visually observed after the high pressure steam sterilization treatment and was also evaluated in terms of a Haze value determined according to an ASTM D-1003 method;

Sanitariness: determined by a test method for a plastic container for transfusion according to the Japanese Pharmacopoeia; and Visual appearance: The conditions of wrinkles, deformation and breaking were visually observed.

The visual observation results are evaluated as follows: ⊚ Very good ○ Good △ Fair x Poor

EXAMPLES 1 to 3 and COMPARATIVE EXAMPLES 1 to 3

The following polymers were used as those of the inner, intermediate, and outer layers of the medical bags of Examples 1 to 3 and Comparative Examples 1 to 3.

PE(1): Low-density polyethylene prepared by a high-pressure method having a density of 0.927 g/cm$^3$, an MFR of 1.1 g/10 min, and a Young's modulus of 3200 kg/cm$^2$;

PE(2): Ethylene-butene-1 copolymer having a density of 0.909 g/cm$^3$, an MFR of 1.2 g/10 min, a Young's modulus of 1480 kg/cm$^2$, an average carbon number of the alkyl group of the short-chain branch of about 2, and an average number of the short-chain branch per 1000 carbon atoms of about 27;

PE(3): Ethylene-butene-1 copolymer having a density of 0.896 g/cm$^3$, an MFR of 1.5 g/10 min, a Young's modulus of 630 kg/cm$^2$, an average carbon number in the alkyl group of the short-chain branch of about 2, and an average number of the short-chain branch per 1000 carbon atoms of about 35;

PE(4): Ethylene-hexene-1 copolymer having a density of 0.900 g/cm$^3$, an MFR of 2.0 g/10 min, a Young's modulus of 620 kg/cm$^2$, an average carbon number in the alkyl group of the short-chain branch of about 4, and an average number of the short-chain branch per 1000 carbon atoms of about 30;

PE(5): Ethylene-butene-1 copolymer having a density of 0.950 g/cm$^3$, an MFR of 1.5 g/10 min, a Young's modulus of 7200 kg/cm$^2$, an average carbon number in the alkyl group of the short-chain branch of about 2, and an average number of the short-chain branch per 1000 carbon atoms of about 4;

EVA(1): Ethylene-vinyl acetate copolymer having a vinyl acetate content of 20% by weight, a density of 0.941 g/cm$^3$, an MFR of 2.0 g/10 min, and a Young's modulus of 810 kg/cm$^2$;

EPR: Ethylene-propylene type elastomer having a density of 0.900 g/cm³, a melt flow rate of 1.3 g/10 min, and a propylene content of 28% by weight;

Laminated sheets having the composition of the polymers and the thicknesses of the layers listed in Table 1 were prepared from the above-mentioned polymers by using a water-cooling co-extrusion inflation method in Examples 1 and 2 and Comparative Examples 1 and 2 and by using a T-die method in Example 3 and Comparative Example 3. From the laminated sheets thus obtained, medical bags having internal volumes of 500 ml were formed.

The various properties and characteristics of these medical bags were determined. The results are shown in Table 2.

modulus of 3850 kg/cm², an average carbon number in the alkyl group of the short-chain branch of about 4, and an average number of the short-chain branch per 1000 carbon atoms of about 10;

PE(10): Ethylene-butene-1 copolymer having a density of 0.917 g/cm³, an MFR of 2.0 g/10 min, a Young's modulus of 2200 kg/cm², an average carbon number in the alkyl group of the short-chain branch of about 2, and an average number of the short-chain branch per 1000 carbon atoms of about 19;

PE(11): Ethylene-butene-1 copolymer having a density of 0.896 g/cm³, an MFR of 1.5 g/10 min, a Young's modulus of 620 kg/cm², an average carbon number in the alkyl group of the short-chain branch of about 2, and an average number of the short-chain branch per

TABLE 1

| No. | Inner layer Kind | Thickness (μm) | Intermediate layer Kind | Thickness (μm) | Melting point (°C.) | Outer layer Kind | Thickness (μm) | Total thickness |
|---|---|---|---|---|---|---|---|---|
| Example 1 | PE(1) | 30 | PE(2) | 190 | 121 | PE(1) | 30 | 250 |
| Example 2 | PE(1) | 30 | PE(3) | 190 | 118 | PE(1) | 30 | 250 |
| Example 3 | PE(1) | 30 | PE(4) | 190 | 120 | PE(1) | 30 | 250 |
| Comparative Example 1 | PE(1) | 30 | PE(5) | 190 | 128 | PE(1) | 30 | 250 |
| Comparative Example 2 | PE(1) | 40 | EVA(1) | 220 | 85 | PE(1) | 40 | 300 |
| Comparative Example 3 | PE(1) | 40 | EPR | 220 | — | PE(1) | 40 | 300 |

TABLE 2

| No. | Heat resistance | Flexibility Modulus (kg/cm²) | Flexibility Natural discharge-ability | Transparency Visual observation | Transparency Haze (%) | Sanitariness | Visual appearance | Overall evaluation |
|---|---|---|---|---|---|---|---|---|
| Example 1 | ◉ | 720 | ◉ | ○ | 2.8 | ○ | ◉ | ○ |
| Example 2 | ◉ | 680 | ◉ | ◉ | 2.4 | ○ | ◉ | ○ |
| Example 3 | ◉ | 710 | ◉ | ◉ | 2.6 | ○ | ◉ | ○ |
| Comparative Example 1 | ◉ | 2500 | x | x | 15.2 | ○ | x | x |
| Comparative Example 2 | ○ | 620 | ○ | ◉ | 2.0 | ○ | △ | △ |
| Comparative Example 3 | ○ | 670 | ○ | ◉ | 2.4 | ○ | △ | △ |

EXAMPLES 4 to 6 and COMPARATIVE EXAMPLES 4 to 6

The following polymers were used as those of the inner, intermediate, and outer layers of the medical bags of Examples 4 to 6 and Comparative Examples 4 to 6.

PE(6): Low-density polyethylene prepared by a high-pressure method having a density of 0.926 g/cm³, an MFR of 1.1 g/10 min, and a Young's modulus of 2950 kg/cm²;

PE(7): Ethylene-hexene-1 copolymer having a density of 0.925 g/cm³, an MFR of 1.0 g/10 min, a Young's modulus of 3050 kg/cm², an average carbon number in the alkyl group of the short-chain branch of about 4, and an average number of the short-chain branch per 1000 carbon atoms of about 14;

PE(8): Ethylene-hexene-1 copolymer having a density of 0.945 g/cm³, an MFR of 2.5 g/10 min, a Young's modulus of 4900 kg/cm², an average carbon number in the alkyl group of the short-chain branch of about 4, and an average number of the short-chain branch per 1000 carbon atoms of about 6;

PE(9): Ethylene-hexene-1 copolymer having a density of 0.935 g/cm³, an MFR of 1.8 g/10 min, a Young's 1000 carbon atoms of about 35;

PE(12): Ethylene-butene-1 copolymer having a density of 0.905 g/cm³, an MFR of 2.7 g/10 min, a Young's modulus of 980 kg/cm², an average carbon number in the alkyl group of the short-chain branch of about 2, and an average number of the short-chain branch per 1000 carbon atoms of about 23;

EVA(2): Ethylene-vinyl acetate copolymer having a vinyl acetate content of 15% by weight, a density of 0.932 g/cm³, an MFR of 1.5 g/10 min, and a Young's modulus of 1050 kg/cm²;

Laminated sheets having the composition of the polymers and the thicknesses of the layers listed in Table 3 were prepared from the above-mentioned polymers by using a water-cooling co-extrusion inflation method in Examples 4 and 5 and Comparative Examples 4 and 5 and by using a T-die method in Example 6 and Comparative Example 6. From the laminated sheets thus obtained, medical bags having internal volumes of 500 ml were formed.

The various properties and characteristics of these medical bags were determined. The results are shown in Table 4.

TABLE 3

| No. | Inner layer Kind | Inner layer Thickness (μm) | Intermediate layer Kind | Intermediate layer Thickness (μm) | Outer layer Kind | Outer layer Thickness (μm) | Total thickness | Melting point of inner and outer layer (°C.) |
| --- | --- | --- | --- | --- | --- | --- | --- | --- |
| Example 4 | PE(7) | 20 | PE(10) | 160 | PE(7) | 30 | 200 | 124 |
| Example 5 | PE(8) | 20 | PE(11) | 160 | PE(8) | 30 | 200 | 128 |
| Example 6 | PE(9) | 20 | PE(12) | 160 | PE(9) | 30 | 200 | 126 |
| Comparative Example 4 | PE(6) | 30 | EVA(2) | 220 | PE(6) | 40 | 300 | 116 |
| Comparative Example 5 | PE(12) | 20 | PE(10) | 160 | PE(12) | 20 | 200 | 119 |
| Comparative Example 6 | PE(7) | 20 | PE(7) | 160 | PE(7) | 20 | 200 | 124 |

TABLE 4

| No. | Heat resistance | Flexibility Modulus (kg/cm²) | Flexibility Natural dischargeability | Transparency Visual observation | Transparency Haze (%) | Sanitariness | Visual apearance | Overall evaluation |
| --- | --- | --- | --- | --- | --- | --- | --- | --- |
| Example 4 | ◉ | 980 | ◉ | ◉ | 3.5 | ○ | ◉ | ○ |
| Example 5 | ◉ | 810 | ◉ | ◉ | 7.4 | ○ | ○ | ○ |
| Example 6 | ◉ | 900 | ◉ | ◉ | 5.3 | ○ | ◉ | ○ |
| Comparative Example 4 | ◉ | 620 | ◉ | ◉ | 3.4 | ○ | ○ | x |
| Comparative Example 5 | ○ | 900 | ◉ | ◉ | 3.2 | ○ | ○ | △ |
| Comparative Example 6 | ○ | 1,200 | △ | △ | 7.0 | ○ | ○ | △ |

As is clear from the results shown in the above-mentioned Examples and Comparative Examples, the medical bags according to the present invention have an excellent flexibility, transparency, heat-resistance, and sanitariness.

Thus, according to the present invention, the medical bags having the following advantages can be provided.

(1) Since the heat resistance is excellent, a substantial generation of wrinkle and deformation does not occurs and the visual appearance is also excellent during the high pressure steam sterilization.

(2) Since the flexibility is excellent, the leakage of the liquid content in the bag does not occur.

(3) Since the transparency is excellent, the conditions of the liquid content in the bag can be readily observed.

(4) The visual appearance is excellent (i.e., neither wrinkles nor deformation occur), and no substantial breaking of the bag occurs.

We claim:

1. A medical bag composed of a laminate having a thickness of 150 to 400 μm comprising
   (i) an inner layer
      (a) of a low-density polyethylene having a density of 0.920 to 0.030 g/cm³.
      (b) an ethylene-1-olefin copolymer having a density of 0.920 to 0.935 g/cm³, or
      (c) a high density polyethylene having a density of 0.935 or more.
   (ii) an intermediate layer of an ethylene-1-olefin copolymer having a density of less than 0.910 g/cm³, and
   (iii) an outer layer of:
      (a) a low-density polyethylene having a density of 0.920 to 0.930 g/cm³,
      (b) an ethylene-1-olefin copolymer having a density of 0.920 to 0.935 g/cm³, or
      (c) a high density polyethylene having a density of 0.935 g/cm³ or more, wherein the thickness of the intermediate layer is 50% to 90% of the total thickness of the laminate.

2. A medical bag as claimed in claim 1, wherein the melt flow rates, determined by the ASTM D1238 method, Condition E, of the inner and outer layers, are independently 0.1 to 20 g/10 min and the melt flow rate, determined by the ASTM D1238 method, Condition E, of the intermediate layer is 0.1 to 20 g/10 min.

3. A medical bag as claimed in claim 1, wherein the Young's moduli of the inner and outer layers are 1200 kg/cm² or more.

4. A medical bag as claimed in claim 1, wherein the Young's moduli of the intermediate layer is 80% or less of those of the inner and outer layers.

5. A medical bag as claimed in claim 3, wherein the Young's modulus of the intermediate 600 to 3500 kg/cm².

6. A medical bag as claimed in claim 1, wherein the laminate is composed of the low-density polyethylene inner and outer layers and the ethylene-1-olefin copolymer intermediate layer having a density of less than 0.910 g/cm³.

7. A medical bag composed of a laminate comprising
   (i) an inner layer of an ethylene-1-olefin copolymer having a density of 0.920 g/cm³ or more,
   (ii) an intermediate layer of an ethyelene-1-olefin copolymer having a density of less than 0.910 g/cm³, and
   (iii) an outer layer of an ethylene-1-olefin polymer having a density of 0.920 g/cm³ or more.

* * * * *